Jan. 25, 1966 J. R. BROWN, JR 3,231,753

CORE MEMORY DRIVE CIRCUIT

Filed Sept. 26, 1960 2 Sheets-Sheet 1

INVENTOR.
JOSEPH REESE BROWN, JR.
BY Christie, Parker & Hale
ATTORNEYS.

INVENTOR.
Joseph Reese Brown, Jr.
BY
Christie, Parker + Hale
ATTORNEYS

United States Patent Office 3,231,753

Patented Jan. 25, 1966

3,231,753
CORE MEMORY DRIVE CIRCUIT

Joseph Reese Brown, Jr., Pasadena, Calif., assignor to Burroughs Corporation, Detroit, Mich., a corporation of Michigan Filed Sept. 26, 1960, Ser. No. 58,240
3 Claims. (Cl. 307—88.5)

The present invention relates to magnetic core memory devices, and more particularly, to core memory drive and select circuits.

Magnetic core memory systems using either coincident current address selection or non-coincident address selection (also called a linear select or word-organized memory) are well known. Both general types of core memories require drive circuitry for addressing individual or groups of cores. In general, to write or read information, current of a controlled magnitude and polarity must be pulsed through two windings linking a selected core in the case of a coincident current memory, or a controlled current must be pulsed through one winding linking a selected group of cores in a linear select memory.

The simplest and most expensive drive configuration is to provide a bidirectional vacuum tube or transistor current driver for each line connected to the selected windings. This method provides no address decoding so that separate address decoding must be done by external circuitry such as a diode matrix.

The more common method of addressing a core memory is by means of a magnetic matrix switch in which a square loop pulse transformer is coupled to each address line. The pulse transformers are pulsed by single-ended read and write drivers. While the number of drivers is reduced by this scheme, the drivers must be more powerful to accommodate the additional load resulting from leakage and saturated inductance of all the inactive switch cores.

The present invention provides a circuit for addressing a core memory using only one or two current drivers. Referred to as a transistor diode matrix drive, the invention combines diodes and transistors in an arrangement for steering current from a current driver in either direction through any one of a number of address lines. The circuit of the present invention is advantageous in that the number of drivers required is greatly reduced. At the same time, address decoding is accomplished eliminating the need for separate decoding circuitry. The speed of the memory is limited only by the cores themselves and not by the drive or address circuitry. As a result, the present invention is more reliable in operation and less expensive to produce than any presently used core memory address systems, and is applicable to both coincident and linear select memories.

In brief, the present invention provides a magnetic core memory circuit including a plurality of magnetic core elements arranged in rows with a common conductor linking each core element in a row. A pair of diodes is connected in series with each common conductor, the diodes of a pair being arranged to conduct current in opposite directions through the associated conductor. A plurality of transistor switching circuits are connected such that a selected pair of switching circuits connects one conductor and a series diode across a constant-current driver source in a polarity to pass current through the conductor, whereby selection and operation of different pairs of switching circuits produces current flow in either direction in any one of the conductors from the driver source.

For a more complete understanding of the invention, reference should be made to the accompanying drawings, wherein.

Figure 1:
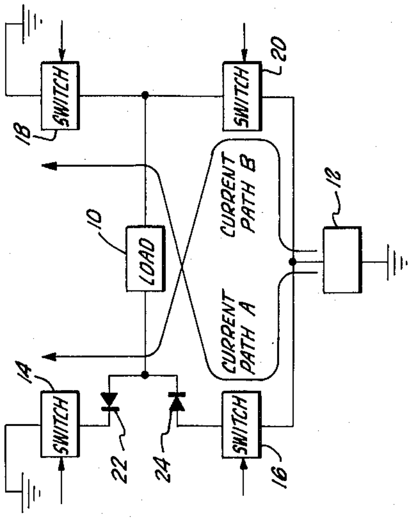
FIGURE 1 is a block diagram illustrating the invention of its basic form.

Referring to FIGURE 1, the arrangement of the present invention is shown in its basic form in which current is directed in either direction through a two-terminal load 10 from a single constant current driver source 12. In its simplest form, the circuit is arranged as a bridge in which each of the four arms of the bridge includes a switch, as indicated at 14, 16, 18 and 20. The load 10 is connected across one diagonal of the bridge and the source 12 is connected across the other diagonal of the bridge. In addition, a diode 22 is connected in series with the switch 14, and a diode 24 is connected in series with the switch 16. The diodes are arranged to pass current in opposite directions through the load 10.

It will be readily apparent that in operation, if switches in opposite arms of the bridge are closed and the other two switches are open, current will pass from the source 12 to the load 10 in one direction. If this condition is reversed, current will pass through the load in the opposite direction. For instance, if the switches 16 and 18 are closed and the switches 14 and 20 are open, current will flow through current path A. If switches 14 and 20 are closed and switches 16 and 18 are open, current will pass along current path B.

Figure 2:
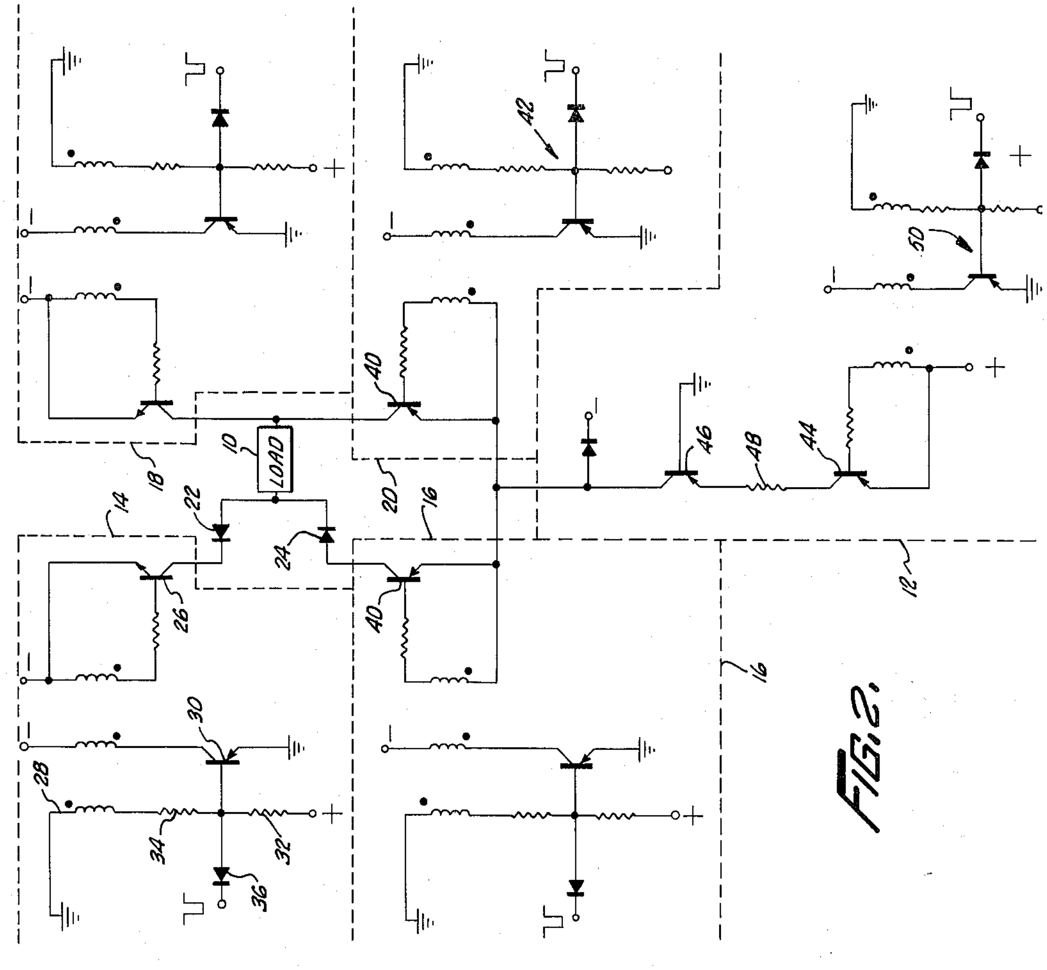
FIGURE 2 is a schematic diagram of one embodiment of the invention.

Referring to FIGURE 2, a schematic diagram is shown of one embodiment of the arrangement of FIGURE 1. In this circuit arrangement transistor switches and a transistor current driver are employed. Switch circuits 14 and 18 are identical and each include a switching transistor 26 preferably of the NPN junction type with the collector connected to the diode 22 and the emitter connected to a negative potential source. The transistor switch 26 is biased on by a transistor blocking oscillator circuit through transformer coupling. The blocking oscillator circuit is conventional and includes a transformer 28 connecting the collector of a PNP junction transistor 30 to a negative potential source. The transistor 30 is normally biased off by connecting the base to a positive potential source through a resistor 32. A regenerative feedback path is provided through a secondary winding of the transformer 28 connected through a resistor 34 to the base of the transistor 30. When a negative pulse, coupled through a diode 36, is applied to the base of the transistor 30, it is biased on, inducing a voltage in the base circuit of the transistor 26, causing the transistor Switches 16 and 20 are similar but each is provided

26 to be biased on.

with PNP junction transistors 40 having the collectors coupled to the load 10. Blocking oscillator circuits 42 are transformer coupled to the bases of the transistors 40, biasing the transistors on in response to negative pulses on the input of the blocking oscillator circuits.

The current source 12 includes a pair of cascaded transistors 44 and 46 connected by a current limiting resistor 48. The transistor 44 is biased on through transformer coupling to a transistor blocking oscillator circuit, indicated generally at 50. In this manner, when the blocking oscillator 50 is pulsed, and input pulses applied to the pairs of switches 16 and 18 or 14 and 20, a constant-current pulse is directed through the load 10 in one or the other of two directions.

Figure 3:
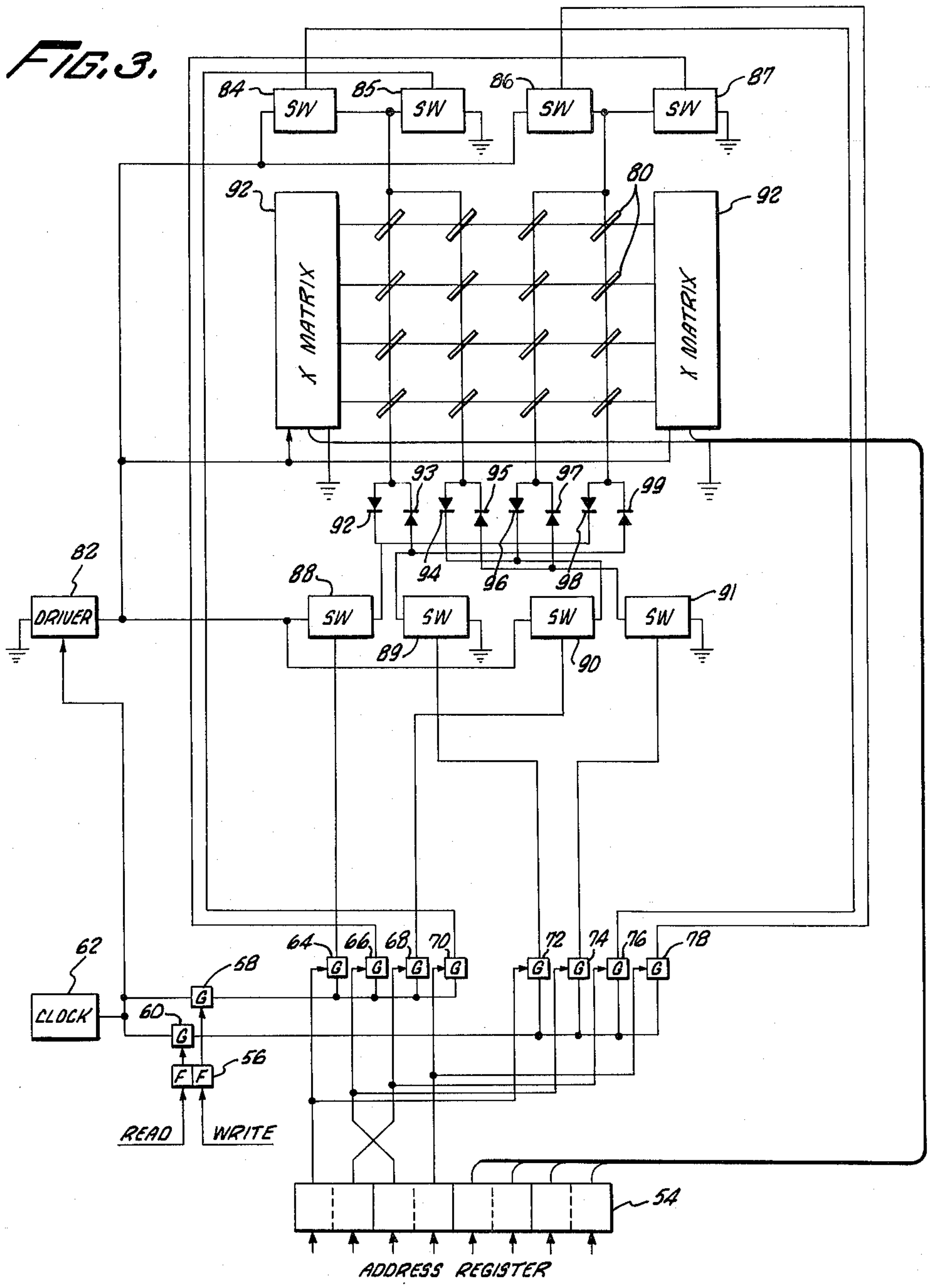
FIGURE 3 is a block diagram of a coincident core memory employing the present invention as part of the drive and selection circuitry.

Referring to FIGURE 3, the application of the invention to a sixteen core memory plane is shown. Address information is stored in binary form in a four-bit address register 54. In addition, a flip-flop 56 stores information as to whether a read or write operation is being performed. Flip-flop 56 biases open one or the other of two gate circuits 58 and 60 for passing negative pulses from a clock source 62. Thus WRITE pulses are passed by the gate 58 and READ pulses are passed by the gate 60. A group of four WRITE gates 64, 66, 68 and 70 are controlled by two of the binary bit storage stages of the register 54 for selectively passing WRITE pulses according to two bits of the four-bit address stored in the register. A second group of four READ gates 72, 74, 76 and 78 are similarly biased by the two stages of the address register 54 so as to selectively pass READ pulses.

The memory plane consists of four vertical lines and four horizontal lines with a magnetic storage core element located at each intersection point, the core elements being indicated at 80. A driver current is passed in either direction through any one of the vertical lines of the core memory plane from a constant-current driver source 82, which is pulsed from the clock source 62. The constant-current driver source 82 is the same as the driver 12 described above in connection with FIGURE 2.

To pass current in either direction through four lines requires eight transistor switches as indicated at 84–91 and eight diodes as indicated at 92–99. The switches 84 and 85, the diodes 92 and 93, and the switches 88 and 89 are connected to the first vertical column of the memory plane in the same manner as described above in connection with FIGURES 1 and 2. The second column uses the same switches 84 and 85, but uses the diodes 94 and 95 and the switches 90 and 91 to form the equivalent of the circuit of FIGURE 1. The third column uses switches 86 and 87, the diodes 96 and 97, and the switches 90 and 91 to form the current steering circuit, while the last column uses the switches 86 and 87, the diodes 98 and 99, and the switches 88 and 89 to form the current steering switch.

By means of the diodes associated with each line of the memory, the number of switches required is greatly reduced because pairs of switches can be shared with current steering circuits of other lines in the memory. In general, the minimum number of switches that can be used is equal to four times the square root of the number of load lines, thus four switches are required for one load line, as described above in connection with FIGURES 1 and 2, eight switches are required for four lines, as described above in connection with FIGURE 3, and twelve switches would be required for nine load lines etc.

The eight switches of FIGURE 3 are pulsed by the outputs of the gates 64–78. If the gates 64 and 70, for example, are biased open, the switches 85 and 88 are pulsed permitting a current to flow through the first load in a downward direction by the driver source 82. A current in the direction to either read or write in any one of the four load lines can thus be selected by biasing on either of the gates 58 and 60 and any pair of the two groups of four gates 64–78.

The four vertical columns are similarly controlled by identical circuitry, indicated generally as the X matrix 92, from the remaining two bits of the address register 54.

It will be seen from the description of FIGURE 3 that any one of a plurality of cores in a memory plane be addressed for either reading or writing, using only a single, or, at most, two current drivers.

What is claimed is:

1. A magnetic core matrix switch comprising a constant current pulse source, a two-terminal load, a bridge circuit including a switch in each arm of the bridge, the constant current source being connected across one diagonal of the bridge and the two-terminal load being connected across the other diagonal of the bridge, each switch including a transistor having collector, emitter and base terminals, two of the transistors being of opposite conductive type from the other two transistors, a first transistor having the emitter and collector terminals connected between the first terminal of the load and one terminal of the source, a second transistor having the emitter and collector terminals connected between the first terminal of the load and the other terminal of the source, a third transistor having the emitter and collector terminals connected between the second terminal of the load and said one terminal of the source, a fourth transistor having the emitter and collector terminals connected between the second terminal of the load and said other terminal of the source, a pair of diodes connected in series between the first terminal of the load and the two transistors connected to the first terminal, the diodes being polarized to permit flow of current in opposite directions through the load, and control means for operating the switches in pairs in opposite arms of the bridge including means coupled to the base and emitter terminals of the first and fourth transistors for biasing the first and fourth transistors conductive as a pair, and means coupled to the base and emitter terminals of the second and third transistors for biasing the second and third transistors conductive as a pair.

2. Apparatus as defined in claim 1 wherein said control means further includes a clock pulse source, and means for selectively gating pulses from said source to one or the other of two outputs, one output being coupled to said biasing means associated with the first and fourth transistors and the other output being coupled to said biasing means associated with the second and third transistors for biasing one or the other of the two pairs of transistors.

3. Apparatus as defined in claim 1 wherein the first and fourth transistors and the second and third transistors are arranged to permit an equal level of current flow in opposite directions through the load.

References Cited by the Examiner

UNITED STATES PATENTS

| | | | |
|---|---|---|---|
| 2,821,639 | 1/1958 | Bright et al. | 307—88.5 |
| 2,885,574 | 5/1959 | Roesch | 307—88.5 |
| 2,914,748 | 11/1959 | Anderson | 340—166 |
| 2,932,007 | 4/1960 | Hense | 340—166 |
| 3,027,546 | 3/1962 | Howes et al. | 307—88 |
| 3,054,067 | 9/1962 | Merrill | 330—13 |
| 3,078,379 | 2/1963 | Plogstedt | 307—88.5 |

IRVING L. SRAGOW, *Primary Examiner.*